March 22, 1966  H. A. LEFLET, JR., ETAL  3,241,936
METHOD OF BENDING GLASS SHEETS Filed March 4, 1963  3 Sheets-Sheet 1

INVENTORS
Herbert A. Leflet, Jr.
BY and Frank J. Carson

Nobbe & Swope
ATTORNEYS

March 22, 1966    H. A. LEFLET, JR., ETAL    3,241,936
METHOD OF BENDING GLASS SHEETS
Filed March 4, 1963    3 Sheets-Sheet 2
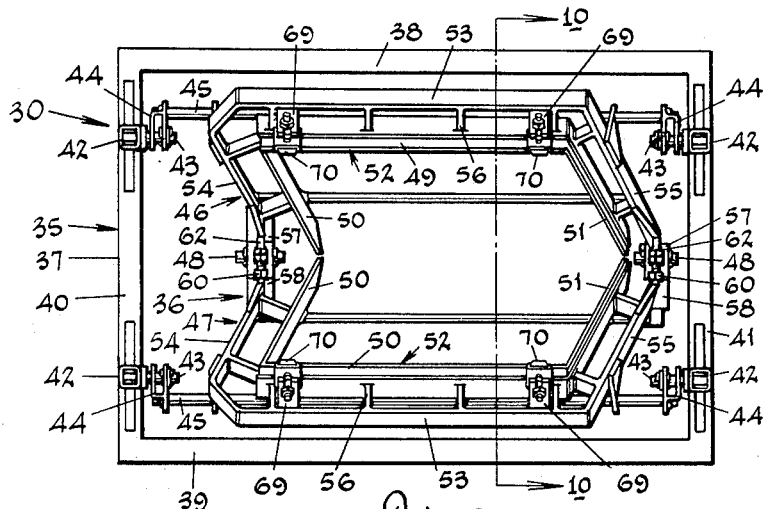
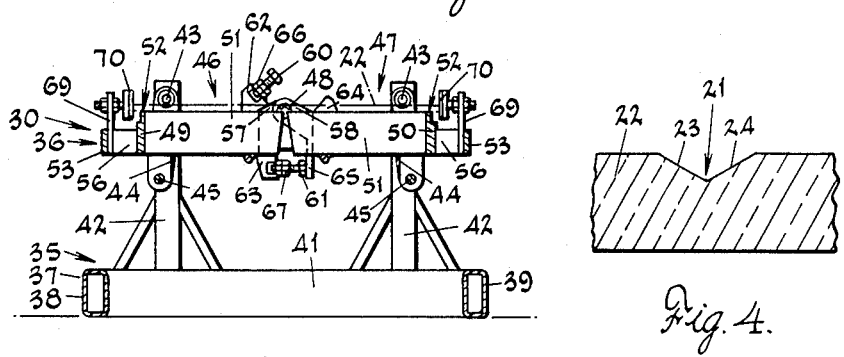
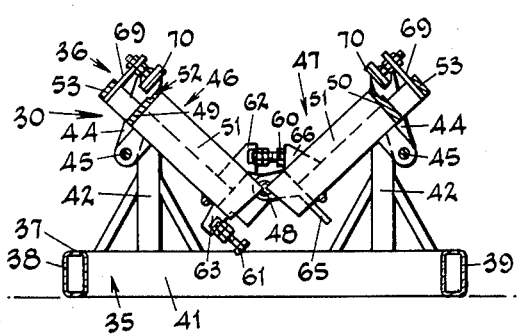
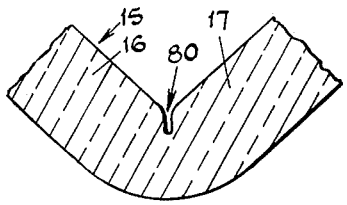
INVENTORS
Herbert A. Leflet, Jr.
BY and Frank J. Carson
Nobbe & Swope
ATTORNEYS INVENTORS
Herbert A. Leflet, Jr.
BY and Frank J. Carson
Nobbe & Swope
ATTORNEYS

United States Patent Office 3,241,936
Patented Mar. 22, 1966

---

3,241,936
METHOD OF BENDING GLASS SHEETS
Herbert A. Leflet, Jr., and Frank J. Carson, Toledo, Ohio, assignors to Libbey-Owens-Ford Glass Company, Toledo, Ohio, a corporation of Ohio
Filed Mar. 4, 1963, Ser. No. 262,412
6 Claims. (Cl. 65—62)

This application is a continuation-in-part of application Ser. No. 224,310 filed Sept. 18, 1962, now abandoned.

The present invention relates broadly to the bending of glass sheets or plates and more particularly to an improved method of bending sheets or plates of glass to relatively sharp angles.

It is an aim of this invention to provide an improved method of bending a sheet or plate of glass to a relatively sharp angle in such a manner as to minimize distortion in the bent sheet or plate.

Another object of the invention is to provide such a method in which one or both surfaces of a glass sheet or plate to be bent is initially provided with a groove or relieved area along which the sheet or plate is subsequently bent.

Another object of the invention is to provide such a method in which the groove or relieved area formed in the glass sheet or plate to be bent establishes a line of weakened resistance along which the sheet or plate will be bent.

A further object of the invention is to provide such a method in which the groove in the glass sheet or plate acts to relieve tension in the outer layer of glass when the sheet or plate is bent and at the same time reduces the degree of compression heretofore imposed on the oppositely disposed inner surface layer whereby the glass along the line of bend will be optically clear and undistorted.

Other objects and advantages of the invention will become more apparent during the course of the following description when read in connection with the accompanying drawings.

In the drawings, wherein like numerals are employed to designate like parts throughout the same:

FIG. 3 is an enlarged sectional view taken on line 3—3 of FIG. 1;

FIG. 4 is an enlarged sectional view taken on line 4—4 of FIG. 2;

FIG. 9 is a plan view of a bending apparatus for carrying out the method of this invention;

FIG. 10 is a transverse vertical sectional view of the bending apparatus taken on line 10—10 of FIG. 9, showing the bending mold in closed position;

FIG. 11 is a view similar to FIG. 10 but showing the bending mold in open position;

Figure 1:
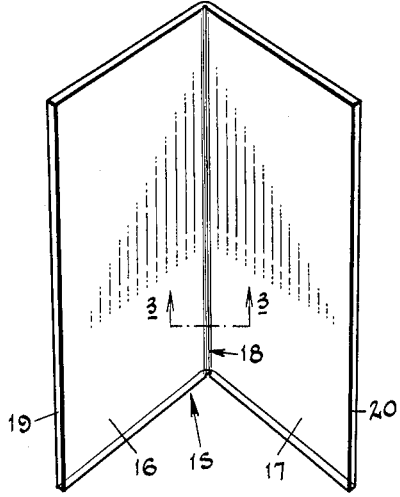
FIG. 1 is a perspective view of a sheet or plate of glass bent in accordance with the method of this invention.

Referring now to the drawings and particularly to FIG. 1, there is shown a bent sheet or plate of glass generally designated by the numeral 15 and including angularly disposed, substantially flat wing portions 16 and 17. The wing portions 16 and 17 are produced by bending the sheet 15 along a line 18 substantially parallel to either one or both of the oppositely disposed longitudinal edges 19 and 20 thereof.

Figure 2:
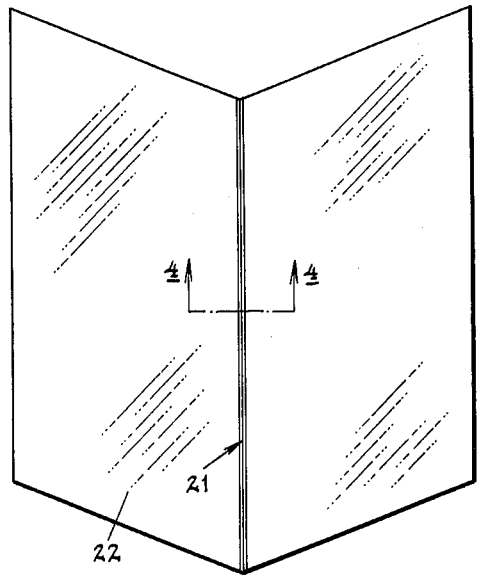
FIG. 2 shows a flat sheet or plate of glass preparatory to being bent to the form shown in FIG. 1.

In carrying out the method of the invention, a substantially straight groove 21, as shown in FIG. 2, is provided in one or both surfaces of a flat sheet of glass 22 to establish a line along which the sheet is to be bent. The groove 21 is continuous and extends from one edge of the glass sheet to the opposite edge. As shown in FIG. 4, the groove is substantially V-shaped and is relatively shallow in depth with relatively wide angularly disposed side walls 23 and 24. The groove 21 may be formed by any well known glass cutting or abrading procedure such as by means of a suitable convexedly angled grinding wheel.

The actual depth of the groove 21 is dependent upon the thickness of the glass sheet 22 and the degree of angle to which it is to be bent. By way of example, in bending glass sheets approximately one-quarter of an inch thick, the depth of the groove may range from one to three thirty-seconds of an inch, with a groove having an average depth of one-sixteenth of an inch producing a satisfactory, optically clear bend to an angle approaching 90°.

It will, of course, be appreciated that the provision of a groove 21 in one or both surfaces of a glass sheet establishes a line of weakened resistance along which the sheet will bend. The size and shape of the groove also contribute importantly to satisfactory bending of the sheet to a relatively sharp angle. In this regard, it will be apparent that the inner surface of a relatively sharp bend in a glass sheet will be in compression with a resultant creation of tension in the opposite or outer surface which stresses normally would result in undesired stretching of the outer sheet surface. This increase in tension would result in linear areas of distortion with consequent loss of optical clarity in or through the glass. According to the method of the present invention, optical distortion is minimized by removing glass from the surface of the sheet in the area of the bend which reduces the magnitude of the compressive stress at the inner surface of the bend and, thereby, the tension at the outer surface of the bend. The angular relation of the side walls 23 and 24 of the groove, which together with the depth of the groove determines the amount of glass to be removed from the surface of the sheet, is dependent upon the angle to which the glass sheet is to be bent.

Figure 12:
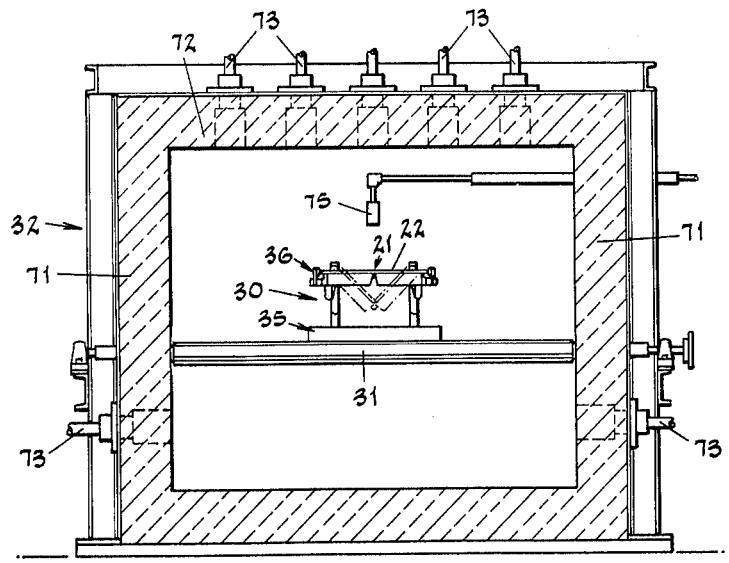
FIG. 12 is a transverse sectional view of a bending furnace in which the method of the invention can be practiced; and, FIGS. 13, 14 and 15 are perspective views of three sheets of glass bent in accordance with the invention for use in the glazing of openings in automobiles.

After the groove 21 has been formed in one or both surfaces of a flat glass sheet 22, the sheet is placed on a bending apparatus, generally designated by the numeral 30 in FIGS. 9, 10 and 11, and moved by a conveying means, such as a roll conveyor 31, through a bending furnace 32 as illustrated in FIG. 12 in which the bending of the sheet takes place. The bending apparatus 30 includes a support rack 35 on which is carried a mold 36. The rack 35 includes a substantially rectangular base frame 37 having longitudinally disposed side rails 38 and 39 joined at their opposite ends by transverse end rails 40 and 41. Affixed to each of the end rails 40 and 41 adjacent the corners of the base, are vertically disposed posts 42. Each post 42 is provided at its upper end with a horizontal rod 43 on the inwardly directed end of which is swingably carried the upper end of a link 44. The links 44 associated with the aligned pairs of rods 43 are provided at their lower ends with support rods 45 on which the mold 36 is bodily carried.

Figure 6:
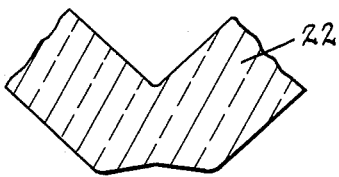
FIG. 6 is a view showing the glass sheet of FIG. 5 bent in accordance with the invention.

The mold 36 is formed of two swingably related sections 46 and 47 which are movable between the closed position shown in FIG. 6 and the open position shown in FIG. 11 about the axes of aligned pintles 48. The mold sections 46 and 47 include longitudinally arranged, oppositely disposed parallel side rails 49 and integral oppositely disposed end rails 50 and 51. As disclosed, the complementary end rails 50 and 51 of each mold section 46 and 47 are generally parallel to one another and are angularly located with respect to the related side rail 49. Each of the rails 49, 50 and 51 is essentially, though not necessarily, a straight line element with the upper surface thereof constituting a portion of the shaping surface corresponding in outline and elevation to the shape desired for the bent glass sheet. Each shaping rail is likewise provided with a bracing rail 53, 54 and 55, respectively, with connecting webs 56 being located in spaced relation therebetween. The adjoining ends of the juxtaposed bracing rails 54 and 55 are equipped with hinge elements 57 and 58 in which the pintles 48 are journaled for pivotally connecting the inner ends of the mold sections together.

The angular relationship of the mold sections 46 and 47 in the closed and open positions of the mold is determined by set screws 60 and 61 which are threaded into blocks 62 and 63 carried by the mold section 46. Thus, screws 60, at opposite ends of the mold, above the axes of the pintles 48, engage stop plates 64 fixed to the mold section 47 to establish the angle at which the mold sections are located in the closed mold position of FIG. 10. Likewise, the screws 61, beneath the axes of pintles 48, upon engagement with stop plates 65 also carried by mold section 47, determine the location of the shaping surface 52 of the mold sections 46 and 47 in a substantially horizontal plane when the mold is in its open position. Lock nuts 66 and 67 are carried by set screws 60 and 61 to lock them in adjusted position.

To suitably locate the glass sheet 22 to be bent with reference to the mold shaping surface, when the mold sections 46 and 47 are in the open position, each of the side bracing rails 53 is provided with brackets 69 on which locator blocks 70 are adjustably carried. When positioning the flat sheet of glass to be bent on the mold, the mold is first moved to an open position, as in FIG. 11, and the sheet placed upon the shaping surface of the mold, with the opposite edges of the sheet being engaged by the locator blocks 70 so that the flat glass sheet functions as a strut to retain the mold in the open position during the early stage of the bending operation.

Figure 5:
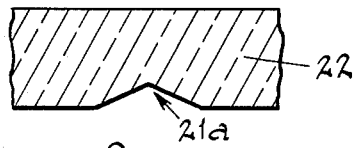
FIG. 5 is a view similar to FIG. 4 but in which the groove is provided in the opposite surface of the flat glass sheet or plate.
Figure 7:
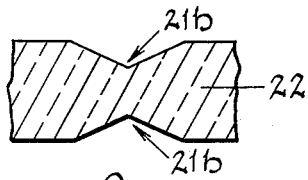
FIG. 7 is a view showing a further modification of the invention.
Figure 8:
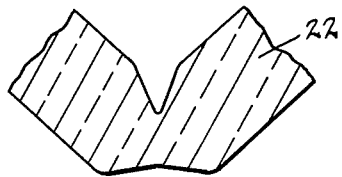
FIG. 8 is a view showing the glass sheet of FIG. 7 after being bent.

Excellent results have been obtained in bending glass sheets to substantially right angles in accordance with the invention by grooving one surface of the glass sheet, which surface becomes the concave surface of the sheet after it is bent as illustrated in FIGS. 1 through 4 of the drawings. However, the opposite surface or both surfaces of the glass sheet may be grooved as illustrated in FIGS. 5 through 8. Thus, as shown in FIG. 5, a groove 21a may be provided in the bottom surface of the flat glass sheet 22, which surface becomes the convex surface of the sheet when bent as shown in FIG. 6. Or both surfaces of the flat sheet 22 may be provided with opposed grooves 21b as shown in FIGS. 7 and 8.

In carrying out the method of this invention, a flat sheet or plate of glass 22 having a groove 21 ground, or otherwise formed in one or both surfaces thereof, is supported horizontally upon the mold 36. At this time, the mold is in its open position as in FIG. 11 and the sheet is supported at its marginal edge portions only upon the shaping surface between the locator blocks 70, with the groove 21 disposed parallel with the aligned axes of the pintles 48. With the sheet thus supported, the bending apparatus 30 is passed through the furnace 32 on the horizontally disposed roll conveyor 31. The side walls 71 and ceiling 72 of the furnace (FIG. 12) are equipped with heating devices 73 that are suitably controlled throughout the length of the furnace to progressively raise the entire sheet to the softening temperature of glass at which it will settle by gravity into conformity with the mold shaping surface 52 as the mold sections 46 and 47 move to the closed position. As aforementioned, engagement of the locator blocks 70 with the opposed edges of the flat glass sheet initially maintains the sections of the mold in the open position; however, as the sheet becomes plastic and the mold sections move to the closed position, the locator blocks further insure against shifting of the sheet relative to the mold surface.

As pointed out above, the groove 21 establishes a substantially straight line of weakened resistance along which the sheet bends when heated in the manner described. To further facilitate bending the sheet to a relatively sharp angle, it has been found desirable to heat the glass along the area of the groove to a relatively higher temperature than the areas to opposite sides thereof. To accomplish this without simultaneously overheating the wing sections of the sheet, in accordance with the invention, gas burners 75 are disposed substantially in the longitudinal medial area of the furnace in position to direct flames downwardly therefrom in the area of the groove 21 as the sheet is carried therebeneath. This serves to raise the area of the sheet along the groove to proper temperature for bending before the wing sections have become sufficiently softened to become deflected from substantially flat planes.

When the groove 21 is provided in the upper surface of the sheet, the downwardly directed, concentrated flames of burners 75 additionally serve to soften the outer layer of the upwardly directed surfaces 23 and 24 of the groove 21 and thus produce a fire-polished condition on said surfaces, thereby removing any surface marks caused during formation of the groove such as by a grinding operation.

As the mold moves to the closed position, the glass sheet bends along the line defined by the groove 21 to a relatively sharp angle with the wing sections lying in angularly disposed planes. With the groove formed in the upper surface of the sheet as shown in FIG. 4, during such bending, the walls 23 and 24 of groove 21 will be folded toward one another to provide a groove or crease 80 in the inner surface of the sheet as shown in FIG. 3. In this instance, the provision of the groove 21 eliminates excess glass along the line of bend on the inner surface of the sheet which glass would be compressed causing distortion in the sheet along the groove. The provision of the groove reduces compressive stresses in the inner surface layer of the sheet and at the same time lessens the setting up of tensional stresses in the outer surface layer of the sheet.

The same over-all effect, that is, the elimination of distortion and reduction of stresses in the glass, is achieved by grooving the opposite surface of the sheet as shown in FIG. 5 or by grooving both surfaces of the sheet as shown in FIG. 7. The removal of glass along the line of bend results in less glass being displaced when the sheet is bent and this in turn results in less distortion and a reduction of the compressive stress in the inner surface layer of the sheet as well as the tensional stress in the outer surface layer of the sheet.

While the shaping surfaces 49, 50 and 51 of the bending mold are illustrated as being straight to provide a bent sheet having substantially flat wing portions, as shown in FIG. 1, it will be appreciated that the mold shaping surfaces may also be contoured to provide bent sheets having curved wing portions.

Figure 13:
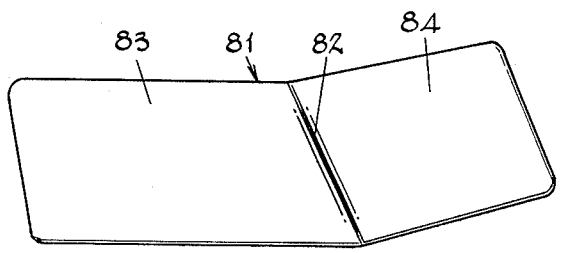
Figure 14:
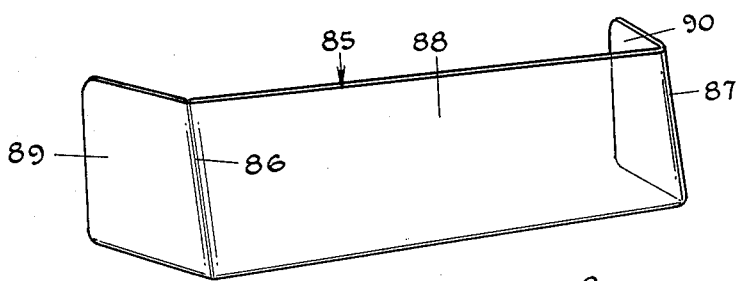
Figure 15:
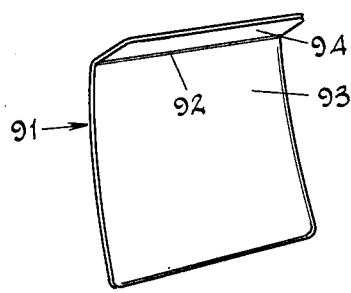

The method of this invention is also of utility in bending glass sheets of various shapes, sizes and curvatures for use in glazing the openings of automobiles. By way of example, the method may be advantageously used in bending the windshield or back window of an automobile, as illustrated in FIGS. 13 and 14 or an automobile door lite as illustrated in FIG. 15. In FIG. 13, a glass sheet 81 is bent along the previously formed groove 82 to provide a substantially V-shaped windshield or back window having angled wing portions 83 and 84 which may be flat or curved. In FIG. 14, the glass sheet 85 is bent along grooves 86 and 87 located inwardly of the opposite ends thereof to provide a central section 88 and angled wing portions 89 and 90. Here, also, the central section and wing portion may be either flat or curved. In FIG. 15 is illustrated one type of door lite in which a glass sheet 91 is bent along a previously formed groove 92 to provide the body portion 93 with an inwardly directed cap portion 94 along its upper edge and which, when the window is closed, merges into the roof of the car body.

It is to be understood that the forms of the invention herewith described are to be taken as illustrative embodiments only of the same, and that various procedural changes may be resorted to without departing from the spirit of the invention.

We claim:

1. A method of bending glass sheets to relatively sharp angles, which comprises forming a groove in a surface of a flat sheet of glass to be bent, which groove extends continuously along a substantially straight line from one edge of the sheet to the opposite edge thereof, supporting the flat sheet along its marginal edge portions only above a horizontally disposed shaping surface of a bending mold, heating the sheet to bending temperature, and causing the sheet to sag by gravity along the groove into conformity with said shaping surface of the mold.

2. A method of bending glass sheets to relatively sharp angles as defined by claim 1, in which the area of the sheet located along the groove is heated to a softening temperature more rapidly than the areas of the sheet between the groove and the opposed marginal edges thereof to effect initial bending of the sheet along said groove.

3. A method of bending glass sheets to relatively sharp angles as defined by claim 1, in which the entire sheet is heated to bending temperature, and in which the grooved portion of the sheet is heated to a relatively higher temperature to cause the sheet to bend by gravity along said groove to conform to the shaping surface of the mold.

4. A method of bending glass sheets to relatively sharp angles, which comprises forming a groove in a surface of a flat sheet of glass to be bent, which groove extends continuously in a straight line from one edge of the sheet to the opposite edge thereof, said groove being provided with outwardly divergent side walls, supporting the flat sheet horizontally along its marginal edge portions only on the shaping surface of a bending mold having a curvature to which the sheet is to be bent, heating the sheet to bending temperature, and simultaneously heating the sheet along the groove to a higher temperature than the remainder of the sheet to cause said sheet to bend by gravity along said groove and to conform to the curvature of the shaping surface of the mold.

5. A method as claimed in claim 4, in which the sheet is supported on the mold with the groove in the upper surface thereof, and in which the groove is heated by concentrated flames of combustible gas to soften the side walls of the groove preparatory to bending of the sheet thereby to produce a fire-polished finish on the surface of said side walls of the groove.

6. A method of bending glass sheets to relatively sharp angles as defined by claim 1, in which a second groove is formed in the opposite surface of said sheet, said second groove being disposed opposite to said first-named groove.

References Cited by the Examiner

UNITED STATES PATENTS

| 2,157,794 | 5/1939 | MacDonald et al. | 264—152 X |
| 2,176,999 | 10/1939 | Miller | 65—287 X |

FOREIGN PATENTS 155,077 11/1938 Austria.

DONALL H. SYLVESTER, *Primary Examiner.*